US009471854B2

(12) United States Patent
Sano

(10) Patent No.: US 9,471,854 B2
(45) Date of Patent: Oct. 18, 2016

(54) TAPE PRINTER AND RECORDING MEDIUM

(71) Applicant: Brother Kogyo Kabushiki Kaisha, Nagoya-shi, Aichi-ken (JP)

(72) Inventor: Nako Sano, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/870,096

(22) Filed: Sep. 30, 2015

(65) Prior Publication Data

US 2016/0189013 A1 Jun. 30, 2016

(30) Foreign Application Priority Data

Dec. 26, 2014 (JP) ................................ 2014-266007

(51) Int. Cl.
*G06K 15/02* (2006.01)

(52) U.S. Cl.
CPC ......... *G06K 15/022* (2013.01); *G06K 15/1852* (2013.01); *G06K 2215/0097* (2013.01)

(58) Field of Classification Search
None
See application file for complete search history.

(56) References Cited

U.S. PATENT DOCUMENTS

2004/0208682 A1* 10/2004 Akaiwa .................. B41J 3/4075 400/613
2005/0226670 A1* 10/2005 Akaiwa .................. B41J 3/4075 400/615.2
2009/0103123 A1* 4/2009 Ikedo ......................... B41J 3/46 358/1.12
2014/0085668 A1* 3/2014 Ishii ....................... B41J 3/4075 358/1.15
2015/0037545 A1* 2/2015 Sun .................... G06K 15/1801 428/195.1

FOREIGN PATENT DOCUMENTS

JP 2004-216833 A 8/2004

* cited by examiner

*Primary Examiner* — Andrew H Lam
(74) *Attorney, Agent, or Firm* — Banner & Witcoff, Ltd.

(57) ABSTRACT

The disclosure discloses a tape printer comprising a controller. In a print data generation process, print data to form a first image portion, a second image portion, and a third image portion on a decorative to-be-printed tape is generated. The first image portion has a first length in accordance with a result of acceptance. The second image portion has a second length in accordance with the result of acceptance. The third image portion is composed of a third pattern image corresponding to one pattern type accepted. In a cooperative control process, a decorative tape is produced. A single of the first image portion is formed on a first side, and a single of the second image portion is formed on a second side, and at least one of the third image portion is formed between the first and the second image portions, on a decorative tape.

20 Claims, 12 Drawing Sheets

TAPE PRINTER AND RECORDING MEDIUM

CROSS-REFERENCE TO RELATED APPLICATION

The present application claims priority from Japanese Patent Application No. 2014-266007, which was filed on Dec. 26, 2014, the disclosure of which is incorporated herein by reference in its entirety.

BACKGROUND

1. Field

The present disclosure relates to a tape printer that forms desired print on a decorative tape to be printed, and to a recording medium storing a tape production program.

2. Description of the Related Art

A printer has already been known that applies desired print to a decorative tape to be printed. In this printer, a print area is set in an overlaid manner at an edge portion opposite to an edge portion circumferentially forming a non-print area, on a translucent tape to be printed thereon adhered circumferentially around an adherend such as a wire rod or a bar. This allows the non-print area at one edge portion to be adhered circumferentially, in an overlaid manner, on the print area at the opposite edge portion when adhered circumferentially around the adherend such as the wire rod or the bar, resulting in an improved print durability in the print area.

In the printer of the prior art, the print area has been set and printed only at one edge portion, assuming that the tape to be printed thereon is adhered circumferentially around the adherend such as the wire rod or the bar.

On the other hand, however, print may often be applied, for decorative purposes, to a ribbon used to pack or wrap goods including boxes, etc., or to bundle a plurality of wire rods, etc. When tying both ends of the decorative tape to be printed thereon such as the ribbon in a so-called bowknot, the both ends of the ribbon are laterally protrudingly exposed from the knot. However, there has not hitherto been considered a print style capable of visually improving an aesthetic appearance of such an arrangement of the both ends.

SUMMARY

It is therefore an object of the present disclosure to provide a tape printer and a recording medium that can improve the aesthetic appearance of a bowknot of a produced ribbon.

In order to achieve the above-described object, according to first aspect of the present application, there is provided a tape printer comprising a feeder configured to feed a decorative to-be-printed tape, a printing head configured to form print on the decorative to-be-printed tape fed by the feeder and to produce a decorative tape, and a controller, the controller being configured to execute a selection acceptance process for accepting an input of selection of one pattern type among a plurality of pattern types prepared in advance to form print on the decorative to-be-printed tape, a full-length acceptance process for accepting a specification of a full length of the decorative tape, a print data generation process for generating print data to form a first image portion, a second image portion, and a third image portion on the decorative to-be-printed tape, wherein the first image portion has a first length in accordance with a result of acceptance in the full-length acceptance process, and a first pattern image that has a fixed length and is formed by use of the one pattern type accepted in the selection acceptance process is repeated a plurality of times toward a first side along a tape longitudinal direction in the first image portion, and wherein the second image portion has a second length in accordance with the result of acceptance in the full-length acceptance process, and a second pattern image that has a fixed length and is a mirror image of the first pattern image is repeated a plurality of times toward a second side opposite to the first side along the tape longitudinal direction in the second image portion, and wherein the third image portion is composed of a third pattern image corresponding to the one pattern type accepted in the selection acceptance process, and is set to have a length variable in accordance with the result of acceptance in the full-length acceptance process, and is formed on the second side of the first image portion and on the first side of the second image portion, and a cooperative control process for controlling the feeder and the printing head cooperatively by using the print data generated in the print data generation process, to produce the decorative tape having the full length accepted in the full-length acceptance process, wherein a single of the first image portion is formed in a region on the first side containing an end on the first side, and a single of the second image portion is formed in a region on the second side containing an end on the second side, and at least one of the third image portion is formed between the first image portion and the second image portion, on the decorative tape.

In the tape printer of the disclosure of this application, print data is generated through the print data generating process depending on the result of selection of one pattern type accepted by the selection accepting process and on the full length of a decorative tape accepted by the full length accepting process. Using this generated print data, the decorative tape is produced through the cooperative control of the printer and a feeder in the cooperative control process. This decorative tape has a single first image portion formed in a first-side region (e.g., left-hand region) including a first-side end in the tape longitudinal direction, and a single second image portion formed in a second-side region (e.g., right-hand region) including a second-side end in the tape longitudinal direction.

At that time, in the first image portion, a first pattern image using the selected one pattern type is repeatedly formed plurality of times toward the first side (e.g., left side). In the second image portion, a second pattern image, i.e., a mirror image of the first pattern is repeatedly formed plurality of times toward the second side (e.g., right side) opposite to the first side. This allows the decorative tape to apparently have a style where the same design pattern is arranged in sequence both leftward and rightward.

At that time, however, depending on the magnitude relationship between the full length of the decorative tape and the lengths of the first and the second patterns, just an integer number of the first and the second patterns may not be arranged over the full length, with the result a surplus space (blank space) may occur. Thus, in the present disclosure, to fill in this blank space, a third image portion is disposed on the decorative tape toward the second side of the first image portion and toward the first side of the second image portion (in other words, at positions between the first image portion and the second image portion). To fill in the blank space, the third image portion is provided so as to have a variable length depending on the result of acceptance in the full length accepting process. To secure a natural connection with the first image portion and with the second image portion, the third image portion is composed of a third pattern image corresponding to the selected pattern type.

By virtue of the provision of such a third image portion, a print style can be implemented where apparently the same design pattern extends toward the first side and second side in the first image portion and the second image portion, respectively, positioned at both sides of the third image portion, with a line symmetry across the third image portion. By having such a print style where these first and second image portions including tape ends, respectively, are line-symmetric with each other, a visually bisymmetric appearance can be applied to the both ends and their respective vicinities of the ribbon that are protrudingly exposed leftward and rightward from the knot when the bowknot is formed by the user using this decorative tape. This results in an improved aesthetic appearance of the bowknot.

Further, in order to achieve the above-described object, according to second aspect of the present application, there is provided a non-transitory computer-readable recording medium storing a decorative tape production program for executing steps on a controller included in an operation terminal configured to operate a tape printer comprising a feeder configured to feed a decorative to-be-printed tape and a printing head configured to form print on the decorative to-be-printed tape fed by the feeder and to produce a decorative tape, the steps comprising a selection acceptance step for accepting an input of selection of one pattern type among a plurality of pattern types prepared in advance to form print on the decorative to-be-printed tape, a full-length acceptance step for accepting a specification of a full length of the decorative tape, a print data generation step for generating print data to form a first image portion, a second image portion, and a third image portion on the decorative to-be-printed tape, wherein the first image portion has a first length in accordance with a result of acceptance in the full-length acceptance step, and a first pattern image that has a fixed length and uses the one pattern type accepted in the selection acceptance step is repeated a plurality of times toward a first side along a tape longitudinal direction in the first image portion, and wherein the second image portion has a second length in accordance with the result of acceptance in the full-length acceptance step, and a second pattern image that has a fixed length and is a mirror image of the first pattern image is repeated a plurality of times toward a second side opposite to the first side along the tape longitudinal direction in the second image portion, and wherein the third image portion is composed of a third pattern image corresponding to the one pattern type accepted in the selection acceptance step, and is set to have a length variable in accordance with the result of acceptance in the full-length acceptance step, and is formed on the second side of the first image portion and on the first side of the second image portion, and a print data sending step for sending the print data generated in the print data generating step to the tape printer, to produce the decorative tape having the full length accepted in the full-length acceptance process, wherein a single of the first image portion is formed in a region on the first side containing an end on the first side, and a single of the second image portion is formed in a region on the second side containing an end on the second side, and at least one of the third image portion is formed between the first image portion and the second image portion, on the decorative tape.

DESCRIPTION OF THE PREFERRED EMBODIMENTS

An embodiment of the present disclosure will now be described with reference to the accompanying drawings. In the case where terms “front”, “rear”, “left”, “right”, “up”, and “down” are described as a note in the following drawings, terms “frontward”, “rearward”, “leftward”, “rightward”, “upward”, and “downward” described herein refer to the noted directions, respectively.

<Exterior Schematic Structure of Printer>

Figure 1:
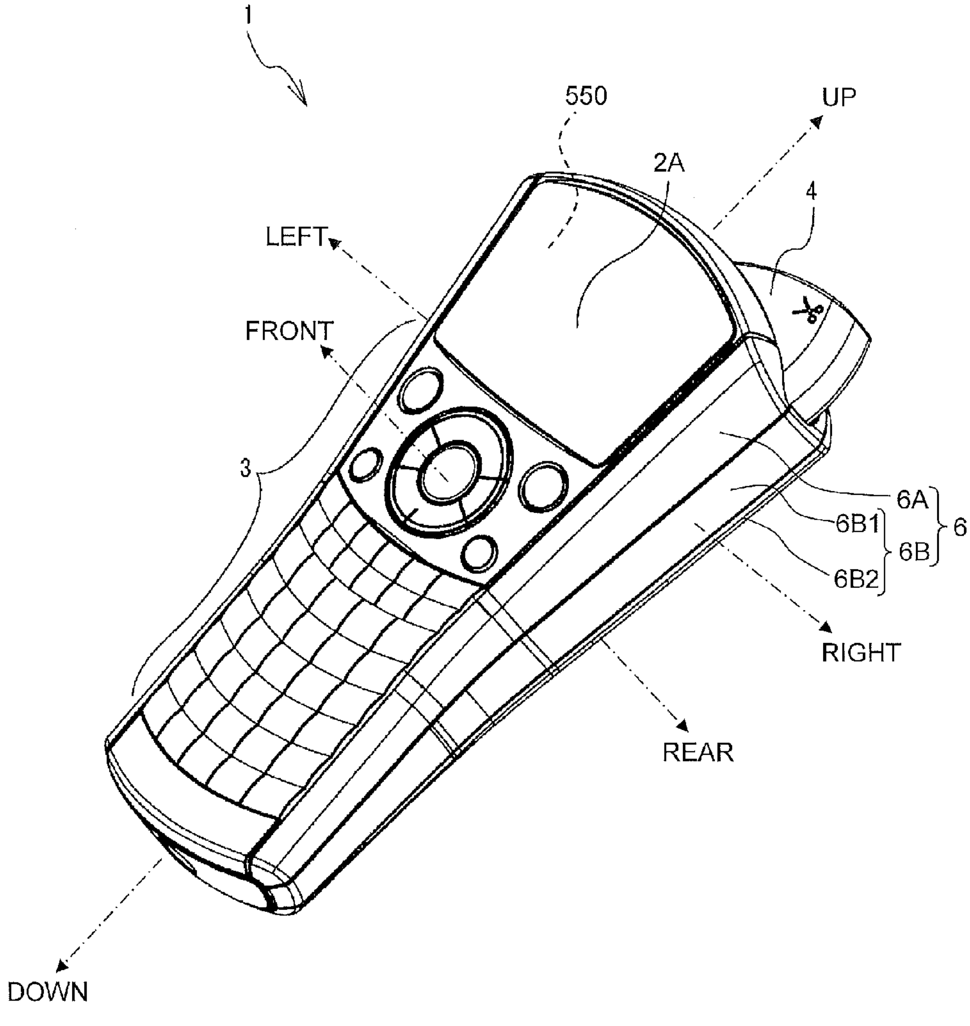
FIG. 1 is a perspective view showing an overall configuration of a tape printer according to an embodiment of the present disclosure.

As shown in FIG. 1, a tape printer 1 is a so-called handy-type tape printer held by a user’s hand. A housing 6 of the tape printer 1 includes a front cover 6A providing the printer front and a rear cover 6B providing the printer rear. The rear cover 6B includes a rear cover body 6B1 incorporating a variety of mechanisms, and a removable cover 6B2 that is removable from the rear cover body 6B1 when loading or unloading a cartridge 31 (see FIG. 3 described later) or a dry battery (not shown).

The front cover 6A has at its upper side a display unit 550 for displaying various setting screens, etc. The front surface of the display unit 550 is covered with a cover panel 2A made of, e.g., a transparent acrylic plate. Below the cover panel 2A is disposed an operating unit 3 for operating the tape printer 1. The operating unit 3 includes letter keys for the input of letters, symbols, numerals, etc., various function keys, and proper buttons. The user inputs the content to be formed as print, based on an operation of the operating unit 3 so that corresponding print data is generated to display the content thereof on the display unit 550. The rear cover body 6B1 has at its upper right end a cut lever 4 for cutting off a decorative tape 301 to be printed (see FIG. 3 described later) on which print is formed as the above.

<Internal Structure of Printer>

Figure 2:
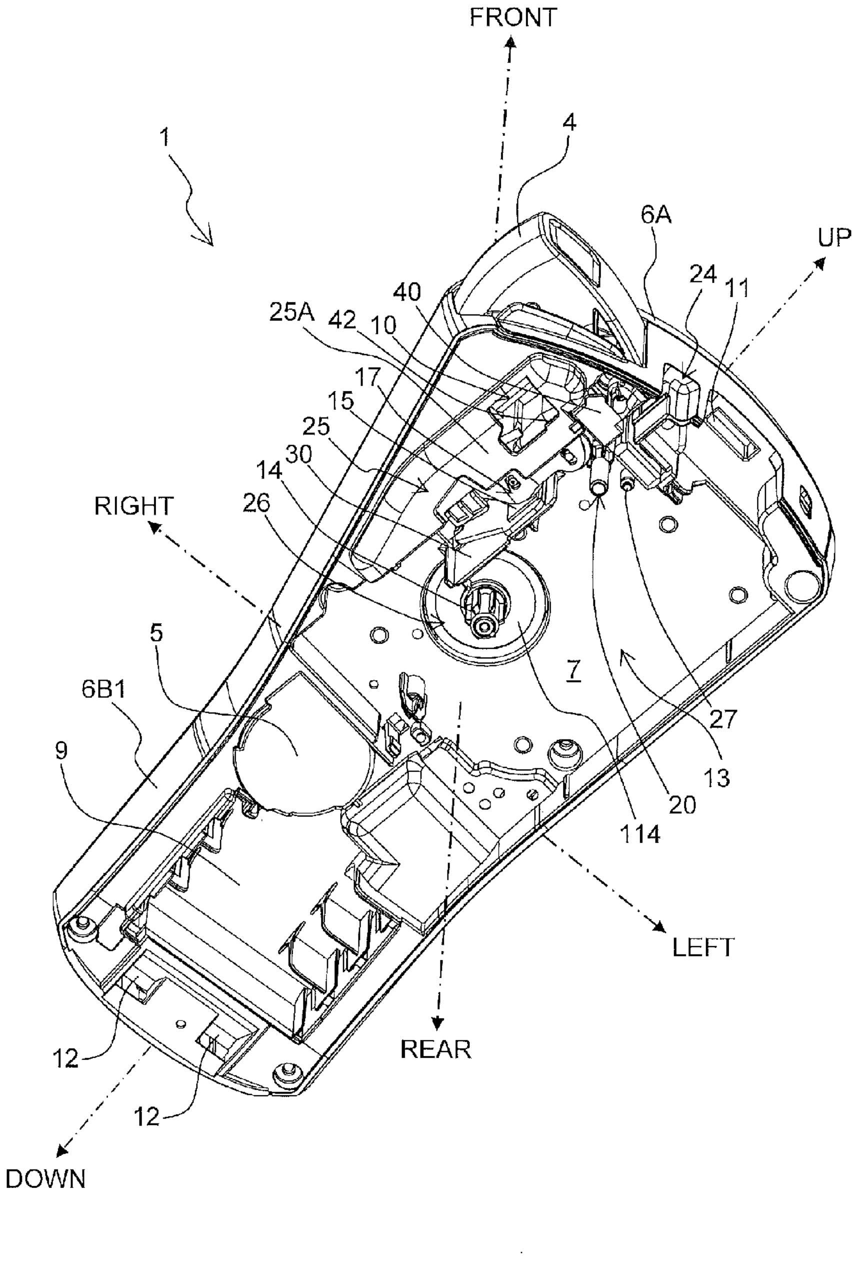
FIG. 2 is a perspective view showing an internal structure of the tape printer, with a removable cover being removed, and with a cartridge and a dry battery being removed from a cartridge holder and a battery housing, respectively.

Referring to FIG. 2, an internal structure of the tape printer 1 will be described. As can be seen in FIG. 2, a frame 13 molded from e.g., resin is arranged within an interior space defined by the front cover 6A and the rear cover body 6B1. On the frame 13 at its rear upper portion is disposed a rectangular-in-plan cartridge holder 7 that is recessed to removably attach the cartridge 31 (see FIG. 3 described later) thereto.

Below the cartridge holder 7 is disposed a motor housing unit 5 for housing a drive motor (not shown). Further below the motor housing unit 5 is disposed a battery housing unit 9 for housing dry batteries.

The frame 13 has at its upper portion a discharge slit 24 for discharging the decorative tape 301 (see FIG. 3 described later) to the exterior. A roller holder 17 is disposed on the frame 13 at its upper right portion. Behind the roller holder 17 is disposed a plate-shaped synthetic resin plate 25 provided to cover the roller holder 17. The plate 25 has at its upper portion a protrusion insertion port 10 that is an opening. The rear cover body 6B1 has at its upper end a lock hole 11 and has at its lower end two lock holes 12.

The frame 13 has at its substantially central portion a concaved recess 26 for gear. A gear (not shown) is provided in the recess 26 for gear, with teeth of the gear are covered with a shielding umbrella portion 114 so as to prevent the teeth from being exposed. Behind the gear there extends vertically a ribbon take-up shaft 14 for taking up an ink ribbon 55 (see FIG. 3 described later).

A rib 30 extends vertically on the right side of the ribbon take-up shaft 14. A heat sink 15 that is a rectangular heat radiation plate is disposed on a right side surface of the rib 30. A roller shaft 20 extends vertically between the rib 30 and the discharge slit 24. A raised portion 27 extends vertically on the left side of the roller shaft 20. The raised portion 27 is inserted into a recessed portion (not shown) of the cartridge 31, to thereby position the cartridge 31 in the longitudinal direction.

In the vicinity of the discharge slit 24 of the frame 13 is disposed a guide holder 40 accommodating therein a cutter holder (not shown) having a cutter blade.

In the proximity of the discharge slit 24, a rib 42 is formed integrally with the frame 13. The rib 42 is formed on the right side of the discharge slit 24 and extends vertically normal to a planar rear surface of the plate 25.

<Internal Structure of Cartridge>

Figure 3:
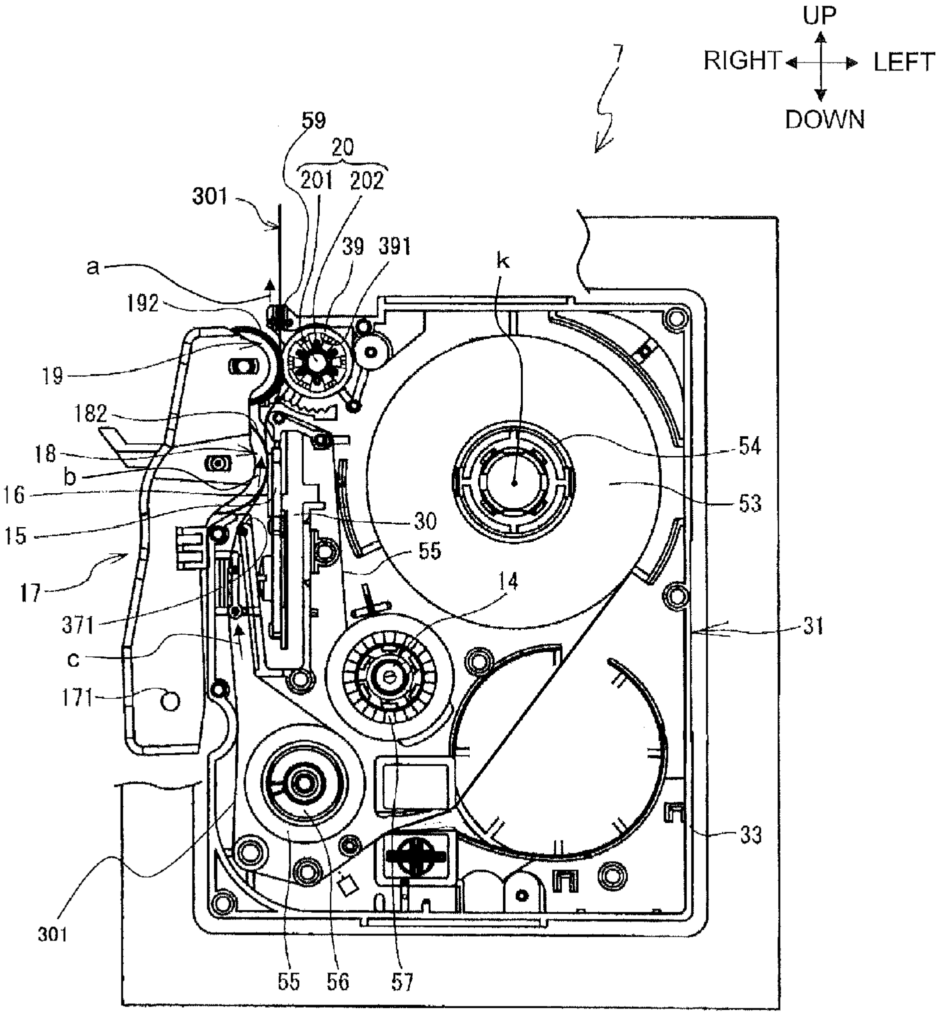
FIG. 3 is a plan view showing an internal structure of the cartridge, together with a roller holder, a rib, a heat sink, a thermal head, etc.

Referring to FIG. 3, an internal structure of the cartridge 31 will be described. As shown in FIG. 3, within the cartridge case 33 at its left lower portion is rotatably arranged a ribbon spool 56 around which the ink ribbon 55 is wound. The ink ribbon 55 drawn from the ribbon spool 56 is guided toward a cartridge opening 371.

A ribbon take-up spool 57 is rotatably arranged adjacent to the ribbon spool 56 in a diagonally left upward direction. The ribbon take-up spool 57 draws the ink ribbon 55 from the ribbon spool 56 and takes up the ink ribbon 55 consumed for print of letters, iconographs, etc. The cartridge 31 has on its left upper side a roll 53 for the decorative tape to be printed (which is originally volute-shaped but is shown as a simplified simple circle). The roll 53 is a roll of the decorative tape 301 wound around a reel 54 having an axis orthogonal to the longitudinal direction of the tape (normal to the plane of paper of FIG. 3). The decorative tape 301 is a tape for ribbon (a tape for producing a decorative-purpose's ribbon described later) made of fabric material and is a to-be-printed material with a surface on which the ink ribbon 55 is overlaid for print by thermal transfer of ink.

On the right side of the cartridge 31 loaded into the cartridge holder 7, an arm-shaped roller holder 17 having a platen roller unit 18 and a discharge roller unit 19 is disposed swingably in the left and right direction around a shaft support 171. When mounting the removable cover 6B2, the roller holder 17 is moved by a protrusion (not shown) toward the cartridge 31. This allows the discharge roller unit 19 and the platen roller unit 18 disposed on the roller holder 17 to move toward a print position (position shown in FIG. 3).

The platen roller unit 18 is arranged on the right side of the heat sink 15. The platen roller unit 18 includes a platen roller 182 and a gear for platen roller (not shown). The platen roller 182 is provided on a position facing a thermal head 16 disposed on a right side surface of the heat sink 15.

The thermal head 16 includes a plurality of heat-generating elements to form desired print on the decorative tape 301 fed by a discharge roller 192, the platen roller 182, etc. The gear for platen gear is meshed with a gear (not shown) disposed on the front side of the frame 13 so that the platen roller 182 is rotated by rotation of the gear for platen roller by power transmitted from a drive motor. As a result, when the platen roller unit 18 moves to the print position, the platen roller 182 feeds the decorative tape 301 toward the discharge roller unit 19 by rotations of the platen roller 182 while pressing the decorative tape 301 and the ink ribbon 55 against the thermal head 16.

The discharge roller unit 19 includes the discharge roller 192 and a gear for discharge roller (not shown). The discharge roller 192 is provided on a position facing the roller shaft 20 and feeds the decorative tape 301 along a feeding path (see arrows a, b, and c) toward the discharge slit 24. The roller shaft 20 includes a cylindrical portion 201 shaped like a cylinder and six ribs 202 extending radially outwardly from the periphery of the cylindrical portion 201. The roller shaft 20 is inserted into a shaft hole 391 of the feed roller 39 disposed on the cartridge 31 so as to rotatably support a feed roller 39.

The gear for discharge roller is meshed with a gear (not shown) disposed on the front side of the frame 13 so that the discharge roller 192 is rotated by rotation of the gear for discharge roller by power transmitted from the drive motor. As a result, when the discharge roller unit 19 moves to the print position, the discharge roller 192 presses the decorative tape 301 against the feed roller 39 rotatably supported on the roller shaft 20. This allows the decorative tape 301 printed by the thermal head 16 as above to be discharged through a discharge port 59. The subsequent feeding path of the decorative tape 301 is such that the decorative tape 301 is fed by the discharge roller 192, etc., to be guided to the discharge slit 24, for discharge to the exterior of the tape printer 1 therethrough. Subsequently, the user operates the cut lever 4 so that the decorative tape 301 is cut off by the cutter blade. By printing and cutting off the decorative tape 301 as above, there is produced a ribbon (see FIG. 5 described later) for packing, bundling, and decorating an object.

<Functional Structure of Control System>

Figure 4:
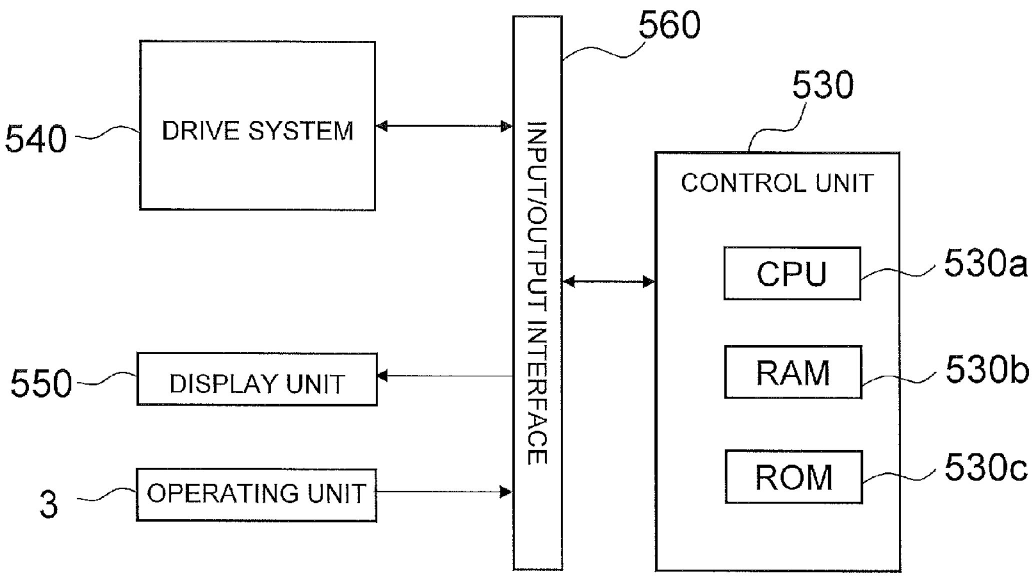
FIG. 4 is a block diagram showing a functional configuration of a control system in the tape printer.

FIG. 4 shows a functional configuration of a control system in the tape printer 1.

In FIG. 4, the tape printer 1 includes a control unit 530 comprised of a microprocessor (not shown in particular) having a CPU 530*a*, a RAM 530*b*, and a ROM 530*c*. The control unit 530 is connected via an input/output interface 560 to: a drive system 540 including a motor drive circuit (not shown) controlling drive of the drive motor and a thermal head driving circuit (not shown) controlling power supply to the thermal head 16; the display unit 550; and the operating unit 3. For example, the ROM 530*c* stores therein a print data compilation/generation application program for executing a control procedure shown in FIG. 7 described later.

Features of this Embodiment

The most feature of this embodiment lies in that, when print is actually applied to the decorative tape 301 to be printed, which is in turn cut off to produce a ribbon R in the above manner, the same design pattern is printed on the vicinity of both ends of the ribbon R so as to be arrayed toward their respective closer ends, whereby print can be done in a print style where line symmetry (mirror image or point symmetry) is established relative to a reference line E0 (see FIG. 5) in the width direction positioned at a center in the longitudinal direction of the ribbon R. The details thereof will hereinbelow be described in due course.

<Content of Print Data Printed on Ribbon>

The content will then be described of print data printed on the ribbon R (the decorative tape 301) by the tape printer 1 having the above configuration.

Figure 5:
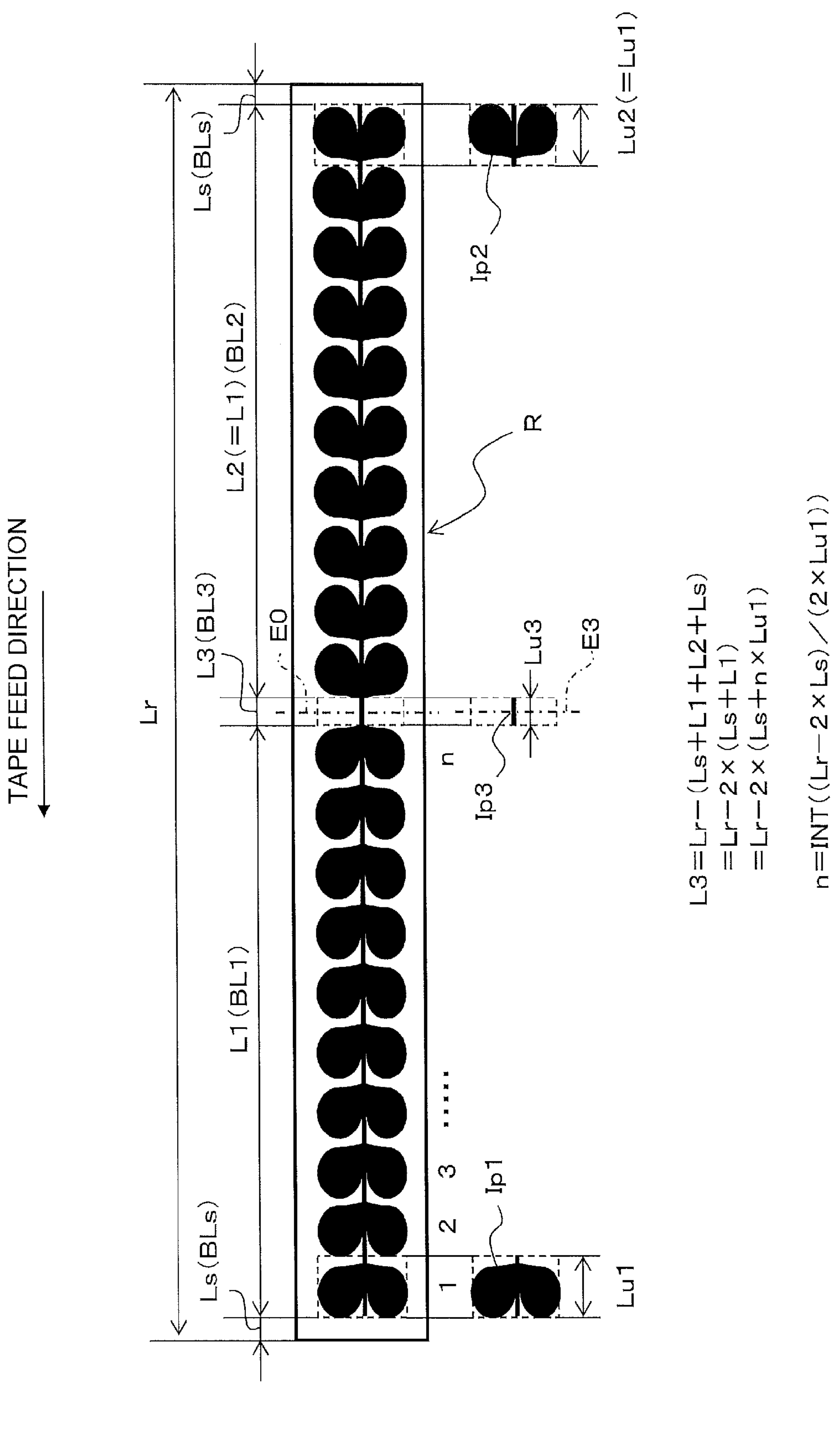
FIG. 5 is a plan view showing one example of the printing content of a printed and produced ribbon.

FIG. 5 is a plan view showing one example of the content of print on the ribbon R which is subjected to print and cut off by the tape printer 1 of this embodiment. In FIG. 5, the ribbon R is produced in full length Lr that is optionally set by the user as described later. The shown ribbon R of this example has five adjoining regions, i.e., a blank block BLs, a first block BL1, a third block BL3, a second block BL2, and a blank block BLs in the mentioned order from downstream (left side of the diagram) toward upstream (right side of the diagram) of the tape feed direction (tape longitudinal direction). The first block BL1, the third block BL3, and the second block BL2 thereamong have print formed thereon, whereas the blank blocks BLs at both ends have no print formed thereon, providing plain white blank regions. The lengths of the first block BL1, the third block BL3, the second block BL2 along the tape feed direction are set to a first block length L1, a third block length L3, and a second block length, respectively, while the blank blocks BLs at both ends are set to have a blank block length Ls of the same length (it may be a fixed length or an optionally set length).

The first block BL1 has a print array where n (n is an integer not less than 2; the same shall apply hereinafter) end print patterns Ip1 optionally selected by the user are juxtaposed in the tape feed direction. The end print pattern Ip1 of the shown example is a print pattern image representing a cotyledon that opens toward downstream in the tape feed direction, with its length Lu1 in the tape feed being set in advance to a specific length (fixed length) of the end print pattern Ip1. To impart an enhanced aesthetic appearance to the entire print region of the first block BL1, it is desirable that the image of this end print pattern Ip1 be an image that looks like a naturally continuous design pattern irrespective of juxtaposition of a plurality of images toward the same direction along the tape feed direction.

The second block BL2 has a print array where n (equal to the number in the first block BL1) end print reverse patterns Ip2 are juxtaposed in the tape feed direction, the end print reverse pattern Ip2 being a mirror image of the end print pattern Ip1 with respect to the tape feed direction. The end print reverse pattern Ip2 of the shown example is a print pattern image representing a cotyledon that opens toward upstream in the tape feed direction, with its length Lu2 in the tape feed direction being set to be equal to the length Lu1 of the end print pattern Ip1. As will be described later, this end print reverse pattern Ip2 may be generated by converting the end print pattern Ip1.

In this embodiment, the number n of the print patterns arrayed in each of the first block BL1 and the second block BL2 is set to a maximum value permitted by the ribbon full length Lr. That is, n is an integer value of a division value obtained as a result of dividing by the end print pattern length Lu1 (Lu2) half of a length Lr−2×Ls obtained by subtracting the total length of the two blank block lengths Ls at both ends from the optionally set full length Lr of the ribbon R. Accordingly, this number n is obtained from $$Nn=INT((Lr-2\times Ls)/(2\times Lu1)) \quad \text{(Eq. 1)}$$

Where INT is a function for finding an integer.

By applying print onto the first block BL1 and the second block BL2, the ribbon R can have a print style where apparently the same design patterns are arrayed toward each of upstream and downstream in the tape feed direction.

However, depending on the ribbon full length Lr and the blank block length Ls, there may often occur a blank portion having a length (<2×Lu1) less than the total length of two end print patterns Ip1, between the first block BL1 and the second block BL2. Thus, in this embodiment, to fill in this blank portion, the ribbon R has a third block BL3 at a position between the first block BL1 and the second block BL2. A length L3 of the third block BL3 in the tape feed direction is set to be variable depending on the ribbon full length Lr, in order to fill in the blank portion. That is, the third block length L3 is a length that is obtained by subtracting, from the ribbon full length Lr, the total length of the two blank block lengths Ls, the first block length L1 (=n×Lu1), and the second block length L2 (=L1). The length L3 is found from $$\begin{aligned} L3 &= Lr-(Ls+L1+L2+Ls) \\ &= Lr-2\times(Ls+L1) \\ &= Lr-2\times(Ls+n\times Lu1) \end{aligned} \quad \text{(Eq. 2)}$$

In the shown example, printed on the third block is a connection print pattern Ip3 representing a stem positioned at a center of cotyledon of the end print pattern Ip1 (with a unit fixed length Lu3 in the tape feed direction) and, more specifically, is a straight line positioned at a center in the width direction of the decorative tape 301 and extending along the tape feed direction. The connection print pattern Ip3 printed on the third block BL3 in this manner is desirably an image with a variable length that can apparently secure a natural connection irrespective of the juxtaposition of the end print patterns Ip1 and the end print reverse pattern Ip2 toward upward and downward, respectively and that can apparently keep a natural continuity irrespective of print with any length in the tape feed direction. In this embodiment, used as the connection print pattern Ip3 is one that is prepared in advance correspondingly to the selected end print pattern Ip1. More specifically, for example, the ROM 530*c* stores therein a plurality of types (see FIGS. 9, 10, 11, etc. described later) of the end print patterns Ip1 each having the length Lu1 in the tape feed direction and simultaneously stores therein a plurality of types (see FIGS. 9, 10, 11, etc. described later) of the connection print patterns Ip3 each having the unit fixed length Lu3. The ROM 530*c* further stores a pattern association table (not shown) therein. In the pattern association table is stored an optimum combination (one-to-one correspondence) of each end print pattern Ip1 and each connection print pattern Ip3. The connection print pattern Ip3 is not limited to the straight line, but it may be of a shape or pattern other than the straight line as long as its single one has a line symmetric shape with respect to the reference line E3 (see FIG. 5) extending in the width direction of the tape.

By disposing the third block BL3 having such a print style, the first block BL1 and the second block BL2 positioned at both sides, respectively, of the third block BL3 can each have a print style where apparently the same design patterns are arrayed toward upstream and downstream in the tape feed direction, with a line symmetry across the third block BL3.

Figure 6:
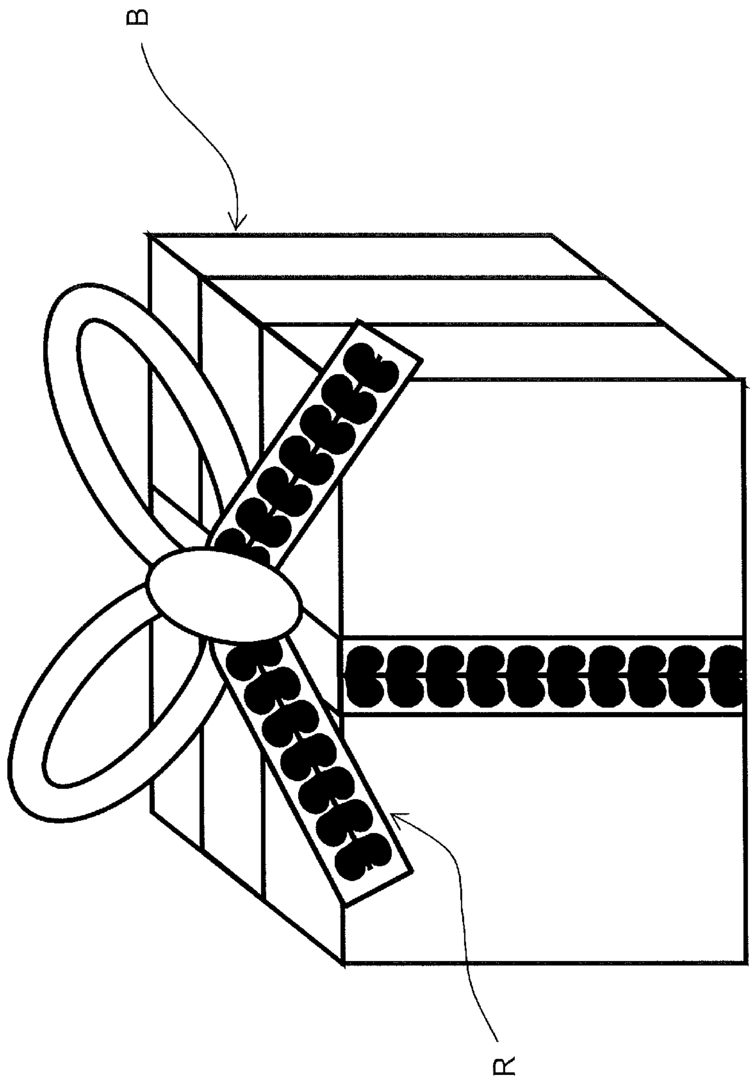
FIG. 6 is a view showing a first use example of the ribbon.

FIG. 6 shows a use example of the thus print-formed and produced ribbon R. In FIG. 6, the ribbon R is wound around the periphery of a box B in the shape of a rectangular parallelepiped, with its both ends being tied in so-called bowknot. In such a usage, the ribbon is used not only to provide a function to wrap the box B but also as an ornament imparting an enhanced aesthetic appearance to the entirety. In the case of tying both ends in a bowknot in this manner, the both ends of the ribbon R are laterally protrudingly exposed from the knot, but since print is formed on the ribbon R in the print style shown in FIG. 5 with such an arrangement of the both ends, the aesthetic appearance around the bowknot can be improved. That is, since print is formed in the print style where in the first block BL1 and the second block BL2 positioned at both ends, respectively, of the ribbon R, apparently the same design patterns are arrayed toward their respective closer ends so as to be a line symmetry with respect to each other, a visually bisymmetric appearance can be applied to the both ends and their respective vicinities of the ribbon R that are protrudingly exposed leftward and rightward from the knot of the bowknot.

<Content of Control Executed by CPU of Control Unit>

Figure 7:
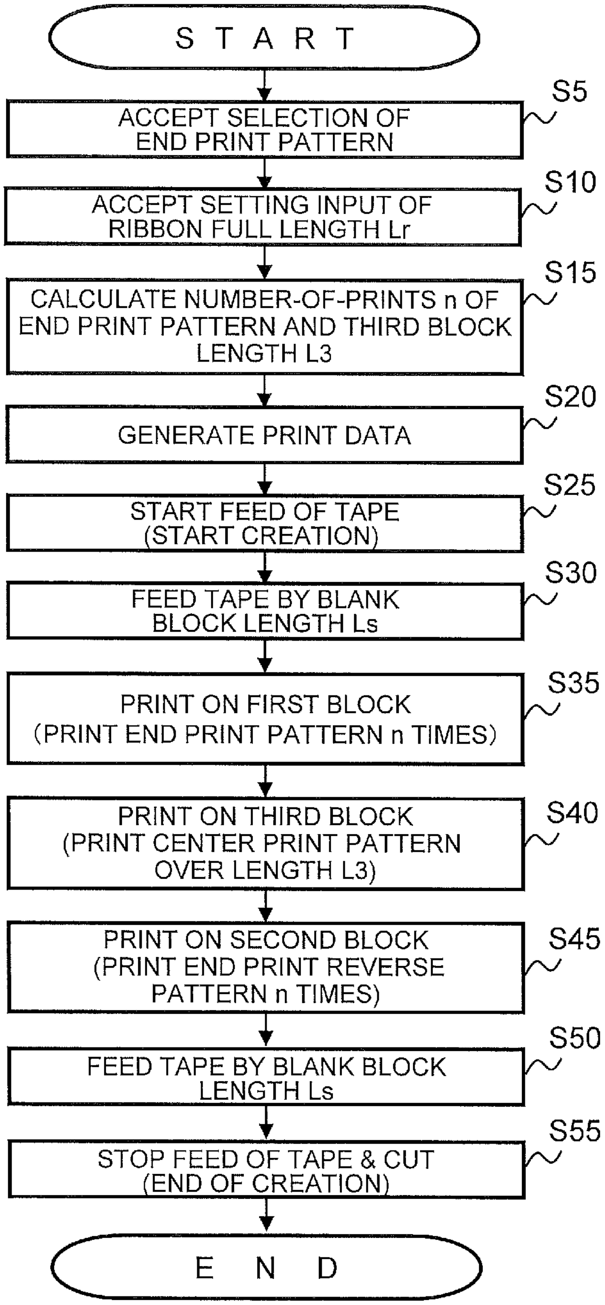
FIG. 7 is a flowchart showing a control procedure executed by a CPU included in a control unit of the tape printer.

Next, referring to FIG. 7, a control procedure will be described that is executed by the CPU 530*a* included in the control unit 530 of the tape printer 1 in order to implement the above technique. Execution of the procedure shown in this flow starts when the print data compilation/generation application program is activated as a result of input of an instruction to produce a decorative ribbon R for example through the operating unit 3 from the user.

First, at step S5, the CPU 530*a* accepts an input of selection of which type of print is to be formed among a plurality of end print patterns Ip1 with different design patterns prepared in advance (as described above, stored in the ROM 530*c*), based on an operation input from the user via the operating unit 3. The CPU 530*a* then refers to the pattern association table of the ROM 530*c*, to decide a connection print pattern Ip3 corresponding to the accepted end print pattern Ip1.

The procedure then goes to step S10 where the CPU 530*a* accepts an input to set the ribbon full length Lr to any length, based on an operation input from the user via the operating unit 3.

The procedure then shifts to step 15 where using a specific length Lu1 corresponding to the end print pattern Ip1 selected at step S5 and a ribbon full length Lr set at step S10, the CPU 530*a* calculates number of prints n of the end print pattern Ip1 (in other words, number of times of repetition of the end print pattern) in each of the first block BL1 and the second block BL2, and a third block length L3 (see Eqs. 1 and 2). A blank block length Ls may be a predefined length or may separately be input and set to any length by the user.

The procedure then goes to step 20 where the CPU 530*a* generates print data to be printed on the entire ribbon R (i.e., the first block BL1, the third block BL3 positioned upstream of the first block BL1 along the tape feed direction, and the second block BL2 positioned upstream of the third block BL3 along the tape feed direction).

More specifically, in the first block BL1, n end print patterns Ip1 selected at step S5 are repeatedly adjacently arrayed along the tape feed direction (in other words, the ribbon length direction).

Figure 9:
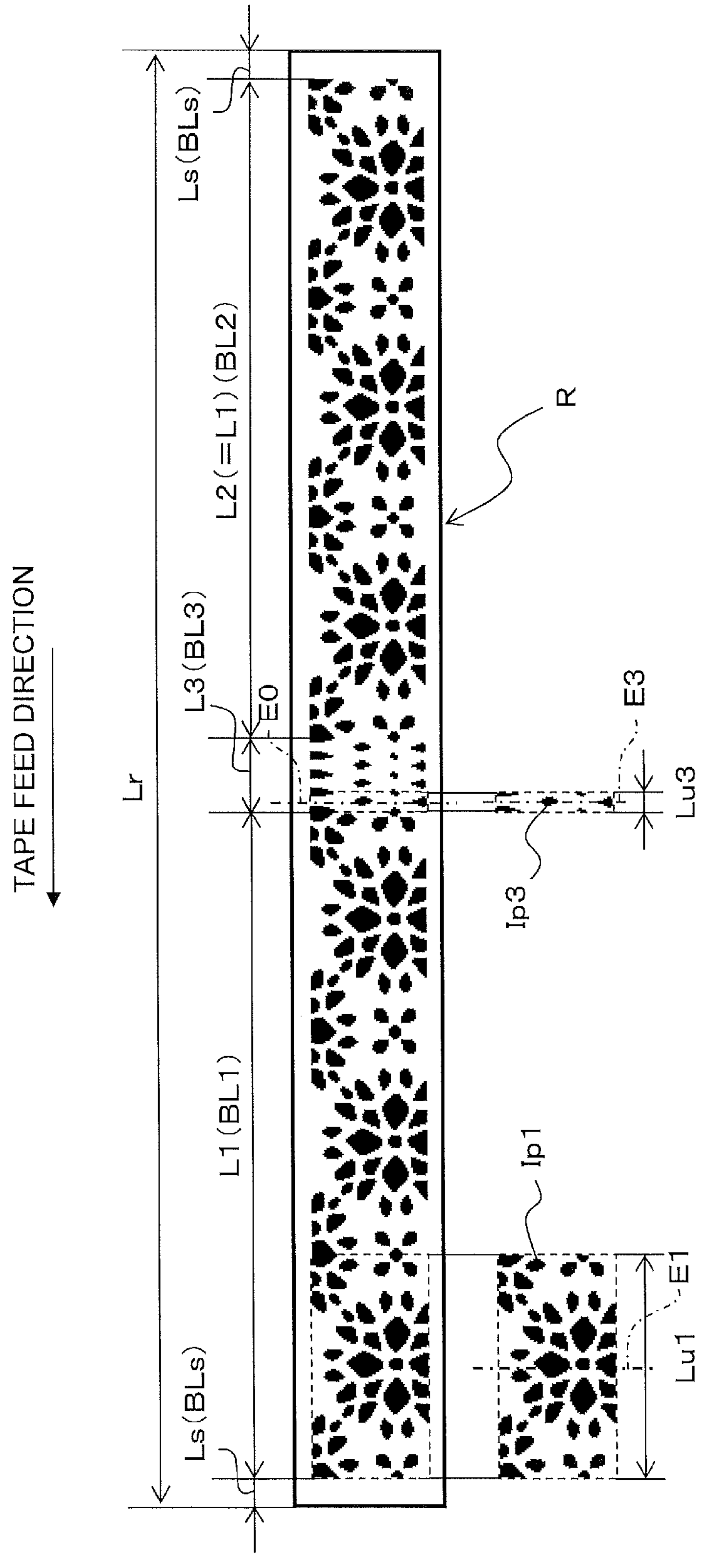
FIG. 9 is a plan view showing one example of the printing content of the ribbon in an example where a plurality of short connection print patterns are arranged side by side on a third block.

In the third block BL3 (having the calculated third block length L3), the connection print pattern Ip3 decided correspondingly to the end print pattern Ip1 at step S10 is repeated at least one time (although the number of times is one in this example, it may be a plurality of number of times; see FIG. 9, etc., described later) along the ribbon length direction. If repeated a plurality of number of times, the number of times of repetition is calculated by the CPU 530*a*, using the third block length L3 calculated at step S15 and the unit fixed length Lu3 of the connection print pattern Ip3.

In the second block BL2, n end print reverse patterns Ip2 are repeatedly adjacently arranged along the ribbon length direction (see FIG. 5, etc.), the end print reverse pattern Ip2 being generated through conversion of the selected end print pattern Ip1 into a mirror image reversed along the tape feed direction.

The procedure then shifts to step S25 where the CPU 530*a* starts production of the ribbon R. More specifically, the drive motor is driven to start feed of the decorative tape 301 to be printed.

The procedure then goes to step S30 where the CPU 530*a* feeds the decorative tape 301 by the blank block length Ls at the downstream end without forming any print.

The procedure then goes to step S35 where the CPU 530*a* applies print to the first block BL1. More specifically, during which the tape is fed through the first block length L1 (in other words, throughout a region of the decorative tape 301 in which the distance from the print start position exceeds Ls and is not more than L1), the CPU 530*a* repeatedly prints the selected end print pattern Ip1 n consecutive times (the above number of times of repetition) by the thermal head 16. The end print pattern Ip1 may be repeatedly printed proper integer times not less than 1 and less than n.

The procedure then goes to step S40 where the CPU 530*a* applies the connection print pattern Ip3 to the third block BL3. More specifically, during which the tape is fed through the third block length L3 (in other words, throughout a region of the decorative tape 301 in which the distance from the print start position exceeds Ls+L1 and is not more than Ls+L1+L3), the CPU 530*a* prints the end print pattern Ip3 with a variable length prepared correspondingly to the selected end print pattern Ip1.

The procedure then goes to step S45 where the CPU 530*a* applies print to the second block BL2. More specifically, during which the tape is fed through the second block length L2 (in other words, throughout a region of the decorative tape 301 in which the distance from the print start position exceeds Ls+L1+L3 and is not more than Ls+L1+L3+L2), the CPU 530*a* repeatedly prints the selected end print reverse pattern Ip3 n consecutive times (the above number of times of repetition) by the thermal head 16. The end print reverse pattern Ip2 may be repeatedly printed proper integer times not less than 1 and less than n. If L2=L1, print is applied to a region of the decorative tape 301 in which the distance from the print start position exceeds Ls+L1+L3 and is not more than Ls+2×L1+L3.

The procedure then goes to step S50 where the CPU 530*a* feeds the decorative tape 301 by the blank block length Ls at the upstream end without forming any print.

The procedure then goes to step S55 where the CPU 530*a* terminates the production of the ribbon R. More specifically, the CPU 530*a* stops the drive of the driving motor to cease the feed of the decorative tape 301 to be printed, after which it displays a print completion on the display unit 550 and provides an indication to urge the user to cut off the decorative tape 301 by the operation of the cut lever 4. Then, this flow terminates.

Effect of this Embodiment

In this embodiment, as described above, in the first block BL1, the end print pattern Ip1 using selected one pattern type is formed repeatedly a plurality of n number of times toward downstream in the tape feed direction. In the second block BL2, the end print reverse pattern Ip2 that is a mirror image of the end print pattern Ip1 is formed repeatedly a plurality of n number of times toward upstream in the tape feed direction. This results in a style where apparently the same design patterns are arrayed both leftward and rightward on the decorative tape 301 to be printed.

To fill in the blank portion between the first block BL1 and the second block BL2, the third block BL3 is disposed whose length is variably set depending on the result of acceptance at step S10 in the procedure. In this third block BL3 is formed the connection print pattern Ip3 corresponding to the selected pattern type, so as to provide a natural connection between the first block BL1 and the second block BL2.

By virtue of the disposition of such a third block BL3, a print style can be implemented where in the first block BL1 and the second block BL2 positioned at both sides, respectively, of the third block BL3 apparently the same design patterns are arrayed toward downstream and upstream, respectively, in the tape feed direction, with a line symmetry across the third block BL3. By having such a print style where these first block BL1 and second block BL2 including tape both ends, respectively, are line-symmetric with each other, a visually bisymmetric appearance can be applied to the both ends and their respective vicinities of the ribbon R that are protrudingly exposed leftward and rightward from the knot when the user forms a bowknot using the ribbon R produced from this decorative tape 301 to be printed. This contributes to an improved aesthetic appearance of the bowknot.

Although in this embodiment, the number of times n of print of the end print pattern Ip1 and the end print reverse pattern Ip2 in the first block BL1 and the second block BL2, respectively, is set to a maximum value permitted by the ribbon full length Lr, this is not limitative. For example, the user may separately set the number of times n to any number not less than 1 and not more than the maximum (the calculated value n of Equation 2). In this case, the third block length L3 may be increased by the reduced length of the first block BL1 and the second block BL2 (not specifically shown).

In this embodiment, particularly, through the processes at steps S30 to S55, a ribbon is produced that has, in the mentioned order, a single first block BL1, a single third block BL3, and a single second block BL2 from the downstream end toward the upstream end in the tape feed direction. This enables the entire ribbon R to have a line-symmetric print array (the same shall apply to modification examples described later) with respect to the reference line E0 extending along the tape width direction by a most simple print style.

In this embodiment, particularly, since the decorative tape 301 is a tape for ribbon made of a fabric material, there can be produced a ribbon R with a strength suitable for the usage such as wrapping, packing, bundling, decorating, etc.

Figure 8:
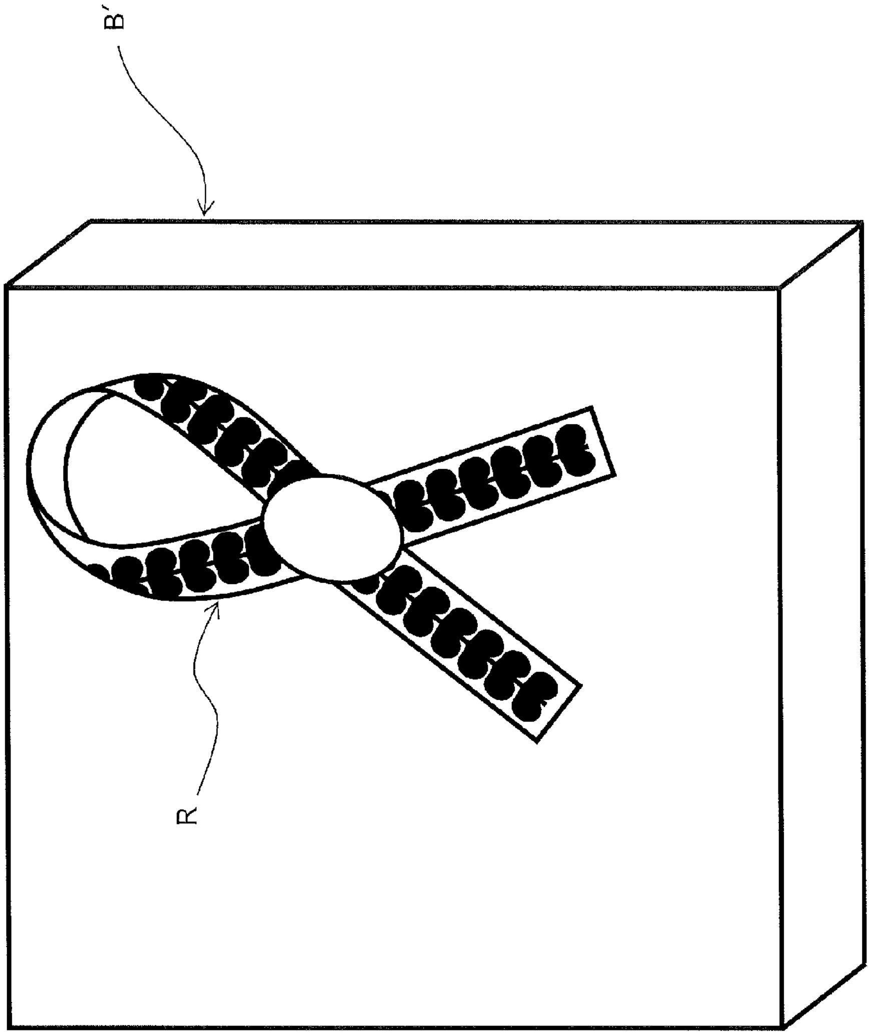
FIG. 8 is a view showing a second use example of the ribbon.

Although in the use example of the ribbon R shown in FIG. 6, the bowknot is formed after winding the ribbon R around the periphery of the object box B, this is not limitative. For example, as shown in FIG. 8, also in the use as a paste ribbon for decorative purposes only pasted on the surface of an object B' with the entire ribbon R being curved and crossed so as to allow the print surfaces of both ends to face frontward, there can be achieved the same effect as the above to improve the visual aesthetic appearance. Otherwise, although not shown particularly, as long as the use style is such that both ends and their respective vicinities of the ribbon R are protrudingly exposed from a predetermined intersection, a visually bisymmetric appearance can be achieved leading to an aesthetic enhancement.

The present disclosure is not limited to the above embodiment, but could be variously modified without departing from the spirit and technical idea thereof. Such modification examples will hereinafter be described in order. In the modification examples, portions equivalent to those of the above embodiment are designated by the same reference numerals and description thereof will properly be omitted or simplified.

(1) Case of Printing Plural Short Connection Print Patterns Side by Side in Third Block Although in the above embodiment, in the third block BL3 is printed the connection print pattern Ip3 comprised of one variable-length data that is extendable along the tape feed direction, the present disclosure is not limited thereto. Otherwise, as shown in FIG. 9, in the third block BL3 there may be printed adjacently side by side a plurality of connection print patterns Ip3 each having a sufficiently short unit fixed length Lu3 in the tape feed direction. Similar to the above, this connection print pattern Ip3 also has by itself a line-symmetric style with respect to the reference line E3 extending along the tape width direction.

That is, a ribbon R is produced that has a single first block BL1, a third block BL3 on which a plurality of connection print patterns Ip3 are printed, and a single second block BL2 in the mentioned order from the downstream end toward the upstream end in the tape feed direction. This enables a complicated continuous pattern as in the example shown to be printed on the third block BL3 as well. If the third block length L3 is not just the integer multiple of the unit fixed length Lu3, the ribbon full length Lu or the blank block length Ls may be finely adjusted.

As in the shown example, there may be used a pattern type in which the end print pattern Ip1 printed repeatedly plurality of times is by itself line-symmetric (a mirror image) with respect to the reference line E1 along the tape width direction. Since in this case the end print pattern Ip1 printed on the first block BL1 coincides in image content with the end print reverse pattern Ip2 printed on the second block BL2, there can be omitted a process of converting the end print pattern Ip1 to generate the end print reverse pattern Ip2.

(2) Case of Printing Center Print Pattern at Center of Ribbon

Figure 10:
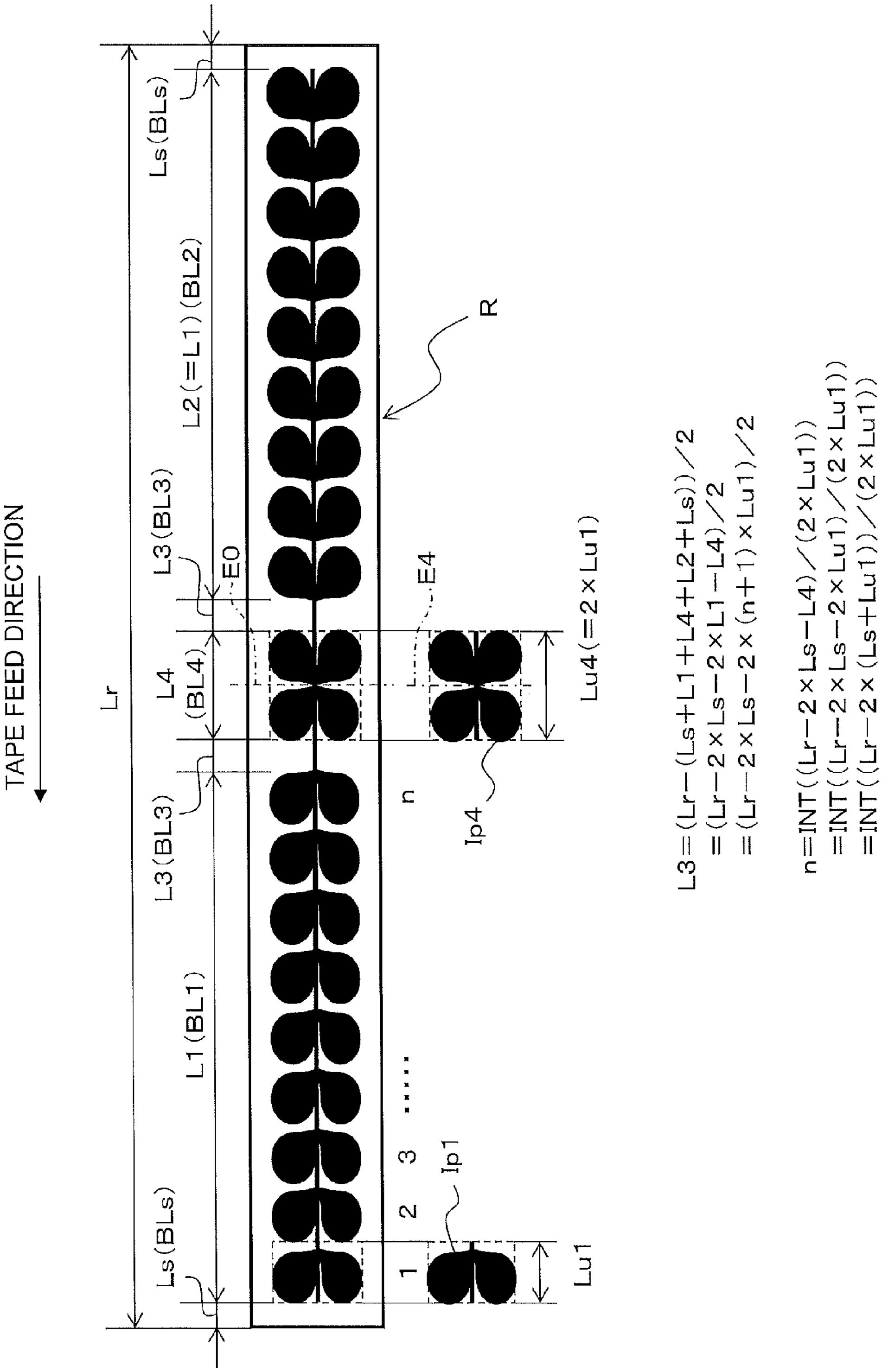
FIG. 10 is a plan view showing one example of the printing content of the ribbon in an example where a center print pattern is printed at the center of the ribbon.

Although the above embodiment has only a single third block BL3 between the first block BL1 and the second block BL2, the present disclosure is not limited thereto. Otherwise, as shown in FIG. 10 using the end print pattern Ip1 and the connection print pattern Ip3 similar to the example of FIG. 5, at a center position of the entire ribbon R in the tape longitudinal direction there may be disposed, separate from the connection print pattern Ip3 printed on the third block BL3, a fourth block BL4 on which is printed a center print pattern Ip4 that is by itself line-symmetric (a mirror image) with respect to a reference line E4 along the tape width direction.

In the shown example, a single center print pattern Ip4 is configured from a composite of a single end print pattern Ip1 printed on the first block BL1, disposed downstream in the tape feed direction and a single end print reverse pattern Ip2 printed on the second block BL2, disposed upstream adjacent to the end print pattern Ip1 in the tape feed direction. As a result, the center print pattern Ip4 is an image (mirror image) that is by itself line-symmetric with respect to the reference line E4 along the tape width direction, and 2×Lu1 is the length L4 in the tape feed direction of the fourth block BL4 on which a single center print pattern Ip4 is printed. The third block BL3 of the same length L3 is interposed between the first block BL1 and the fourth block BL4 and between the fourth block BL4 and the second block BL2.

At this time, the third block length L3 is found by:

$$L3=(Lr-(Ls+L1+L4+L2+Ls))/2$$

$$=(Lr-2\times Ls-2\times L1-L4)/2$$

$$=(Lr-2\times Ls-2\times(n+1)\times Lu1))/2 \quad \text{(Eq. 3)}$$

The number of times n of repetition of the end print pattern Ip1 and the end print reverse pattern Ip2 on the first block BL1 and the second block BL2, respectively, is found by:

$$n=INT((Lr-2\times Ls-L4)/(2\times Lu1))$$

$$=INT((Lr-2\times Ls-2\times Lu1)/(2\times Lu1))$$

$$=INT((Lr-2\times(Ls+Lu1))/(2\times Lu1)) \quad \text{(Eq. 4)}$$

That is, the print data formed on the decorative tape 301 has the first block BL1, the second block BL2, the third block BL3, and the fourth block BL4 having the fourth block length L4 depending on the set and input ribbon full length Lr, the fourth block BL4 being a line-symmetric image with respect to the reference line E4 along the tape width direction including the end print pattern Ip1 toward downstream in the tape feed direction and the end print reverse pattern Ip2 toward upstream in the tape feed direction.

Then the tape printer 1 produces a ribbon R with a ribbon full length Lr on which: using the print data, a single first block BL1 is formed in a downstream region containing a downstream end in the tape feed direction; a single second block BL2 is formed in an upstream region containing an upstream end in the tape feed direction; and at least one third block BL3 and a single fourth block BL4 are formed between the first block BL1 and the second block BL2.

Particularly, in this shown modification example, a ribbon R is produced that includes, in the mentioned order from the downstream end toward the upstream end in the tape feed direction, the single first block BL1, the single third block BL3, the single fourth block BL4 on which the center print pattern Ip4 is printed, the single third block BL3, and the single second block BL2.

Thus, an external appearance can be obtained where the same patterns are arrayed in a visually bisymmetric fashion over the substantially full length of the ribbon R with respect to a border, i.e., a center position in the length direction. As a result, the visual aesthetic appearance can be enhanced more securely.

Figure 11:
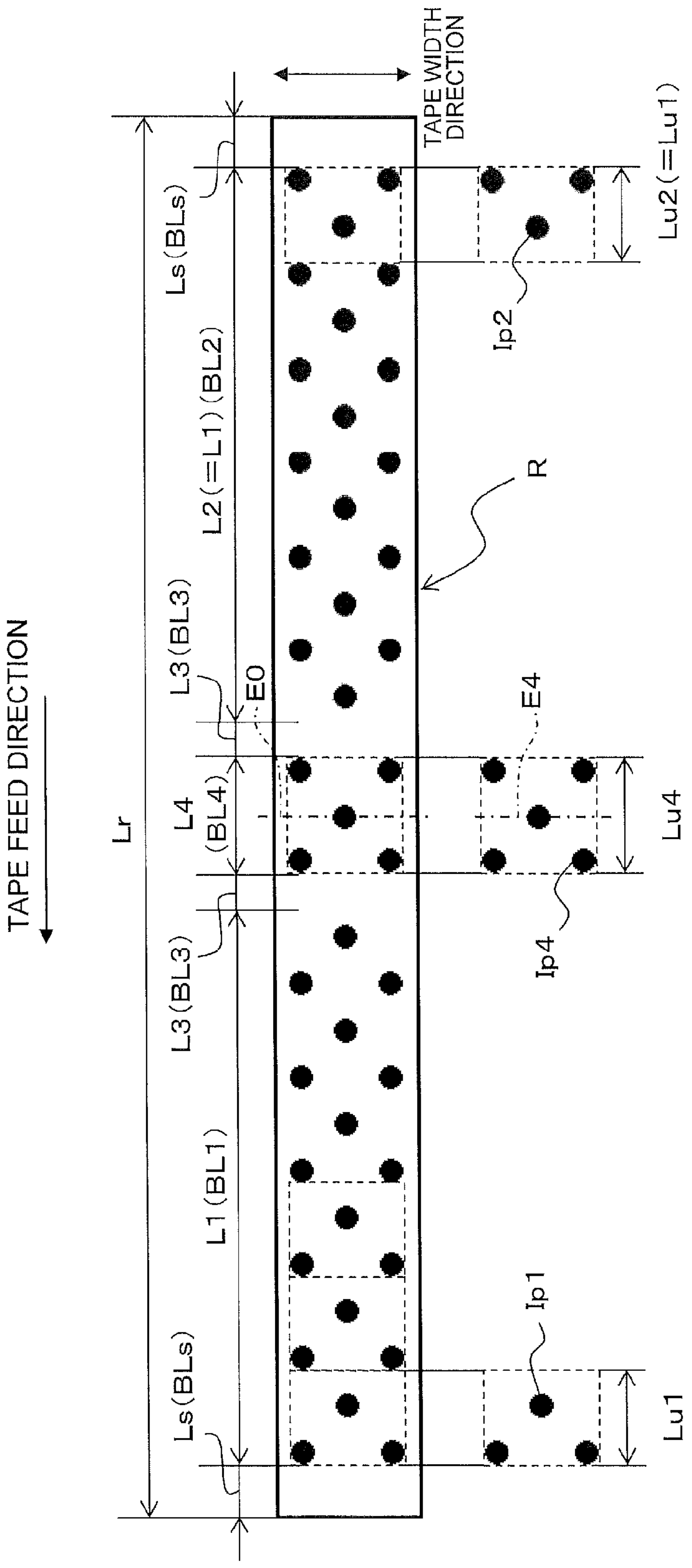
FIG. 11 is a plan view showing another example of the printing content of the ribbon.

Instead of using the cotyledonous pattern type image for the end print pattern Ip1, the end print pattern Ip1 of a dotted image may be used as shown in FIG. 11 for example. In the example shown in FIG. 11, within a single end print pattern Ip1 is formed an image composed of two dots arranged on the downstream side in the tape feed direction symmetrically with respect to the tape longitudinal direction and one dot disposed to a center in the tape width direction on the upstream side in the tape feed direction. In this case, it would be natural that the center print pattern Ip4 be an image composed of two dots arranged on each of the downstream side and the upstream side in the tape feed direction, line-symmetrically with respect to the reference line E4 along the tape width direction, and one dot disposed to the center in the tape width direction on the upstream side in the tape feed direction (five dots in total are arranged). While the fourth block length L4 of such a center print pattern Ip4 is a fixed length less than twice of the end print pattern length Lu1, the third block length L3 and the number of times n may be calculated based on the fourth block length L4. It is preferred in this case that the connection print pattern Ip3 of the third block BL3 be of plain white as shown in the diagram.

Although particularly not shown, the third block BL3 can be omitted if the length obtained by subtracting the blank block length Ls at both ends from the ribbon full length Lr (or the length obtained by further subtracting the fourth block length L4 therefrom) is just the integer multiple of the unit length Lu1 of the end print pattern Ip1. The length of the center print pattern Ip4 in the tape feed direction, i.e., the fourth block length L4 may be variably set depending on the set and input ribbon full length Lr, similar to the third block BL3. Although particularly not shown, the center print pattern Ip4 printed on the fourth block BL4 may be a pattern type (pattern type not derived from the end print pattern Ip1) other than the shown example as long as it is line-symmetric with respect to the reference line E4 along the tape width direction. In this case, while the entire ribbon R is line-symmetric (a mirror image) with respect to the reference line E0 along the tape width direction, there can be obtained aesthetic appearance putting accent on its center position.

(3) Case of Sharing Print Data Generation by Network

Figure 12:
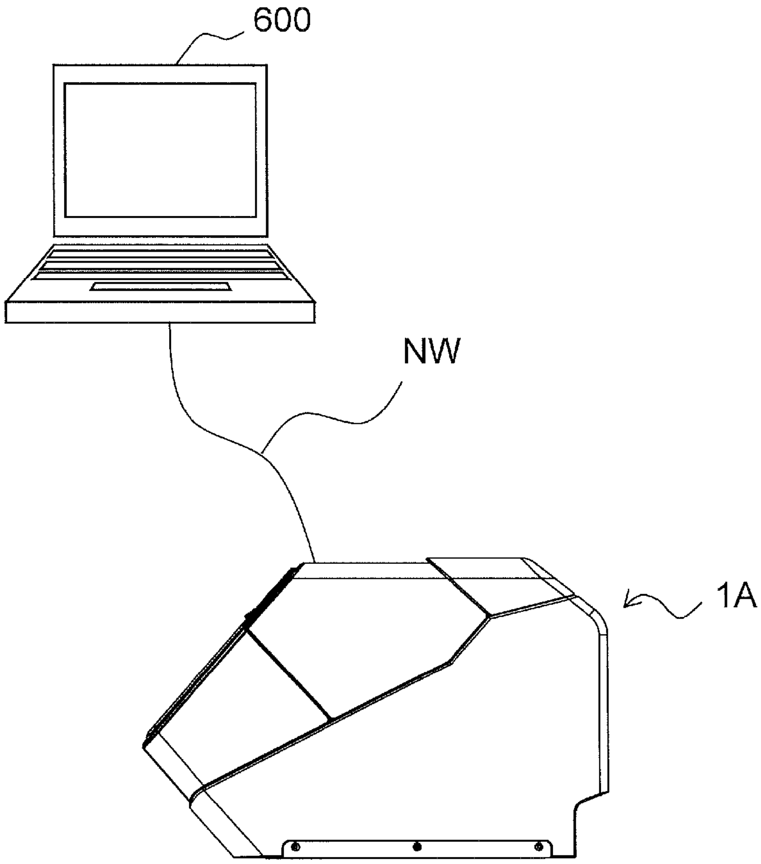
FIG. 12 is an overview diagram in an example employing a network configuration.

Although the above embodiment employs a standalone form in which the tape printer 1 performs by itself all of compilation and generation of print data, printing on the decorative tape 301 to be printed, and cutoff thereof, the present disclosure is not limited thereto. Otherwise, as shown in FIG. 12, a network configuration may be employed where a general-purpose PC 600 is in charge of processes of print data compilation and generation and is connected via a proper network NW to a tape printer 1A that performs only printing on the decorative tape 301 and cutoff thereof. In this case, a proper memory included in the general-purpose PC 600 stores therein a print data compilation and generation application activated in the general-purpose PC 600 and capable of executing a procedure equivalent to that of FIG. 7.

According to this modification example, since the processes of compilation and generation of print data can be omitted, the tape printer 1A can have a simplified configuration.

It is to be noted in the above that arrows shown in FIG. 4 indicate an example of flow of signal and that they do not limit the direction of signal flow.

What is claimed is:

1. A tape printer comprising:

a tape feeder configured to feed a decorative to-be-printed tape;

a printing head configured to form print on said decorative to-be-printed tape fed by said tape feeder and to produce a decorative tape; and a processor, said processor being configured to execute:

a selection acceptance process for accepting an input of selection of one pattern type among a plurality of pattern types prepared in advance to form print on said decorative to-be-printed tape;

a full-length acceptance process for accepting a specification of a full length of said decorative tape;

a print data generation process for generating print data to form a first image portion, a second image portion, and a third image portion on said decorative to-be-printed tape, wherein said first image portion has a first length in accordance with a result of acceptance in said full-length acceptance process, and a first pattern image that has a fixed length and is formed by use of said one pattern type accepted in said selection acceptance process is repeated a plurality of times toward a first side along a tape longitudinal direction in said first image portion, and wherein said second image portion has a second length in accordance with the result of acceptance in said full-length acceptance process, and a second pattern image that has a fixed length and is a mirror image of said first pattern image is repeated a plurality of times toward a second side opposite to said first side along said tape longitudinal direction in said second image portion, and wherein said third image portion is composed of a third pattern image corresponding to said one pattern type accepted in said selection acceptance process, and is set to have a length variable in accordance with the result of acceptance in said full-length acceptance process, and is formed on said second side of said first image portion and on said first side of said second image portion; and a cooperative control process for controlling said tape feeder and said printing head cooperatively by using said print data generated in said print data generation process, to produce said decorative tape having the full length accepted in said full-length acceptance process, wherein a single of said first image portion is formed in a region on said first side containing an end on said first side, and a single of said second image portion is formed in a region on said second side containing an end on said second side, and at least one of said third image portion is formed between said first image portion and said second image portion, on said decorative tape.

2. The tape printer according to claim 1, wherein said fixed length of said first pattern image and said fixed length of said second pattern image are equal to each other.

3. The tape printer according to claim 1, wherein said first pattern image is an image that is the same image as said second pattern image, and is line-symmetric with respect to a reference line extending along a tape width direction.

4. The tape printer according to claim 1, wherein said processor is configured to further execute a first setting process for setting number of times of formation of said first pattern image and said second pattern image in a single of said decorative tape to a maximum number permitted by the full length accepted in said full-length acceptance process.

5. The tape printer according to claim 1, wherein said processor is configured to further execute a second setting process for setting number of times of formation of said first pattern image and said second pattern image in a single of said decorative tape to a value not less than 1 and not more than a maximum number permitted by the full length accepted in said full-length acceptance process.

6. The tape printer according to claim 1, wherein in said print data generation process, print data to form on said decorative to-be-printed tape said first image portion, said second image portion, said third image portion, and a fourth image portion is generated, said fourth image portion having a fourth length in accordance with the result of acceptance in said full-length acceptance process, and containing said first pattern image toward said first side and said second pattern image toward said second side, and being line-symmetric with respect to a reference line extending along a tape width direction, in said cooperative control process, said tape feeder and said printing head are cooperatively controlled by using said print data generated in said print data generation process, to produce said decorative tape having the full length accepted in said full-length acceptance process, wherein the single of said first image portion is formed in the region on said first side containing the end on said first side, and the single of said second image portion is formed in the region on said second side containing the end on said second side, and at least one of said third image portion and a single of said fourth image portion are formed between said first image portion and said second image portion on said decorative tape.

7. The tape printer according to claim 1, wherein in said cooperative control process, said tape feeder and said printing head are cooperatively controlled to produce said decorative tape that, from an end on said first side toward an end on said second side, includes a single of said first image portion, a single of said third image portion, and a single of said second image portion in the mentioned order.

8. The tape printer according to claim 7, wherein said third pattern image is composed of a single variable-length image whose length is variable in the tape longitudinal direction.

9. The tape printer according to claim 8, wherein said third pattern image is a straight line positioned at a center in a tape width direction and extending along said tape longitudinal direction.

10. The tape printer according to claim 8, wherein said third pattern image is a plain white image.

11. The tape printer according to claim 8, wherein said third pattern image is an image that is line-symmetric with respect to a reference line extending along a tape width direction.

12. The tape printer according to claim 1, wherein in said cooperative control process, said tape feeder and said printing head are cooperatively controlled to produce said decorative tape that, from an end on said first side toward an end on said second side, includes a single of said first image portion, said third image portion composed of a plurality of said third pattern images, and a single of said second image portion in the mentioned order.

13. The tape printer according to claim 6, wherein in said cooperative control process, said tape feeder and said printing head are cooperatively controlled to produce said decorative tape that, from an end on said first side toward an end on said second side, includes a single of said first image portion, a single of said third image portion, a single of said fourth image portion, a single of said third image portion, and a single of said second image portion in the mentioned order.

14. The tape printer according to claim 1, wherein said decorative to-be-printed tape is a tape for ribbon made of a fabric material.

15. A tape printer comprising:

a tape feeder configured to feed a decorative to-be-printed tape;

a printing head configured to form print on said decorative to-be-printed tape fed by said tape feeder and to produce a decorative tape;

a processor; and a memory;

said memory storing:

a plurality of types of first pattern data each having a first data length;

a plurality of types of second pattern data each having a second data length; and a pattern data association table in which each type of said first pattern data is one-to-one associated with each type of said second pattern data, said processor being configured to execute:

a selection acceptance process for accepting an input of selection of one type of said first pattern data among said plurality of types of said first pattern data prepared in advance to form print on said decorative to-be-printed tape;

a full-length acceptance process for accepting a specification of a full length of said decorative tape;

a first calculation process for calculating a length of an intermediate print portion in which said second pattern data is formed, by using said first data length of said first pattern data selected in said selection acceptance process and said full length specified in said full-length acceptance process;

a print data generation process for generating print data to form a first print portion, said intermediate print portion, and a second print portion on said decorative to-be-printed tape, wherein said first pattern data selected in said selection acceptance process is repeated plurality of times toward a first side along a tape longitudinal direction in said first print portion, and wherein a length of said intermediate print portion is set to said length of said intermediate print portion calculated in said first calculation process, and said second pattern data acquired by referring to said pattern data association table correspondingly to said first pattern data selected in said selection acceptance process is repeated at least one time along said tape longitudinal direction on said first side of said first print portion in said intermediate print portion, and wherein third pattern data obtained by converting said first pattern data into a mirror image is repeated plurality of times along said tape longitudinal direction on said first side of said intermediate print portion in said second print portion; and a cooperative control process for controlling said tape feeder and said printing head cooperatively by using said print data generated in said print data generation process, to produce said decorative tape having the full length accepted in said full-length acceptance process, wherein said first print portion is formed in a region whose distance from a print start position exceeds a blank block length and is not more than a sum of a predetermined length in accordance with the result of acceptance in said full-length acceptance process and said blank block length, and wherein said intermediate print portion is formed in a region whose distance from said print start position exceeds said sum of said predetermined length and said blank block length and is not more than a sum of said length of said intermediate print portion calculated in said first calculation process, said predetermined length and said blank block length, and wherein said second print portion is formed in a region whose distance from said print start position exceeds said sum of said length of said intermediate print portion, said predetermined length and said blank block length and is not more than a sum of said length of said intermediate print portion, twice said predetermined length and said blank block length.

16. The tape printer according to claim 15, wherein said processor is configured to further execute a second calculation process for calculating number of times of repetition of said first pattern data in said first print portion, by using said first data length of said first pattern data selected in said selection acceptance process and said full length specified in said full-length acceptance process, in said print data generation process, print data that includes said first print portion and said second print portion is generated, wherein said first pattern data is repeated said number of times of repetition calculated in said second calculation process in said first print portion, and wherein said third pattern data is repeated said number of times of repetition calculated in said second calculation process in said second print portion.

17. The tape printer according to claim 15, wherein said processor is configured to further execute a second calculation process for calculating number of times of repetition of said first pattern data in said first print portion, by using said first data length of said first pattern data selected in said selection acceptance process and said full length specified in said full-length acceptance process, in said print data generation process, print data that includes said first print portion and said second print portion is generated, wherein said first pattern data is repeated number of times not less than one time and not more than said number of times of repetition calculated in said second calculation process in said first print portion, and wherein said third pattern data is repeated number of times not less than one time and not more than said number of times of repetition calculated in said second calculation process in said second print portion.

18. The tape printer according to claim 15, wherein said processor is configured to further execute a third calculation process for calculating number of times of repetition of said second pattern data in said intermediate print portion, by using said length of said intermediate print portion calculated in said first calculation process and said second data length, in said print data generation process, print data that includes said intermediate print portion is generated, wherein said second pattern data is repeated said number of times of repetition calculated in said third calculation process.

19. A non-transitory computer-readable recording medium storing a decorative tape production program for executing steps on a processor included in an operation terminal configured to operate a tape printer comprising a tape feeder configured to feed a decorative to-be-printed tape and a printing head configured to form print on said decorative to-be-printed tape fed by said tape feeder and to produce a decorative tape, said steps comprising:

a selection acceptance step for accepting an input of selection of one pattern type among a plurality of pattern types prepared in advance to form print on said decorative to-be-printed tape;

a full-length acceptance step for accepting a specification of a full length of said decorative tape;

a print data generation step for generating print data to form a first image portion, a second image portion, and a third image portion on said decorative to-be-printed tape, wherein said first image portion has a first length in accordance with a result of acceptance in said full-length acceptance step, and a first pattern image that has a fixed length and is formed by use of said one pattern type accepted in said selection acceptance step is repeated a plurality of times toward a first side along a tape longitudinal direction in said first image portion, and wherein said second image portion has a second length in accordance with the result of acceptance in said full-length acceptance step, and a second pattern image that has a fixed length and is a mirror image of said first pattern image is repeated a plurality of times toward a second side opposite to said first side along said tape longitudinal direction in said second image portion, and wherein said third image portion is composed of a third pattern image corresponding to said one pattern type accepted in said selection acceptance step, and is set to have a length variable in accordance with the result of acceptance in said full-length acceptance step, and is formed on said second side of said first image portion and on said first side of said second image portion; and a print data sending step for sending said print data generated in said print data generating step to said tape printer, to produce said decorative tape having the full length accepted in said full-length acceptance process, wherein a single of said first image portion is formed in a region on said first side containing an end on said first side, and a single of said second image portion is formed in a region on said second side containing an end on said second side, and at least one of said third image portion is formed between said first image portion and said second image portion, on said decorative tape.

20. The recording medium according to claim 19, wherein in said print data generation step, print data to form on said decorative to-be-printed tape said first image portion, said second image portion, said third image portion, and a fourth image portion is generated, said fourth image portion having a fourth length in accordance with the result of acceptance in said full-length acceptance step, and containing said first pattern image toward said first side and said second pattern image toward said second side, and being line-symmetric with respect to a reference line extending along a tape width direction, in said print data sending step, said print data generated in said print data generating step is sent to said tape printer, to produce said decorative tape having the full length accepted in said full-length acceptance step, wherein the single of said first image portion is formed in the region on said first side containing the end on said first side, and the single of said second image portion is formed in the region on said second side containing the end on said second side, and at least one of said third image portion and a single of said fourth image portion are formed between said first image portion and said second image portion on said decorative tape.

* * * * *